Feb. 14, 1961      J. M. TESI      2,971,381
ELECTRICIAN'S TOOL
Filed Nov. 22, 1957

Julius M. Tesi
INVENTOR.

BY *Clarence A. O'Brien*
*and Harvey B. Jacobson*
Attorneys

United States Patent Office 2,971,381
Patented Feb. 14, 1961

2,971,381

ELECTRICIAN'S TOOL

Julius M. Tesi, 212 4th St., Yorkville, Ohio

Filed Nov. 22, 1957, Ser. No. 698,133

2 Claims. (Cl. 73—432)

This invention relates generally to electricians' tools and more particularly to a device of general plumb line character having a flexible line of considerable tensile strength, a bob unmagnetized or magnetizable at one end of the line, a cable clamp at the other end of the line, and means to create a magnetic field around said bob and to detect the position of this magnetic field and bob, the cable clamp having novelty per se and being adapted for use in pulling a length of cable from a hidden point in a wall structure, downwardly through the wall, after an aperture has been drilled or otherwise formed in the wall at the detected point, the flexible line being used to pull the end of the cable through said aperture.

The primary object of this invention is to provide means for locating a point substantially vertically beneath another point in a wall, the other point being ordinarily hidden by wall or ceiling structure, and the lower point being ordinarily required to be known so that an aperture may be drilled or otherwise formed in the wall, to facilitate the installation of electrical wiring, wall plugs, and the like.

Another object of this invention is to provide means to perform the function described in the immediately preceding object with minimum labor and expenditure of time, and without damage to the wall.

A further object of this invention is to provide means for pulling the electrical cable downwardly through the wall to the aperture formed at the point detected by this apparatus.

It is a further object of this invention to provide means which will operate to facilitate the utilization of a vertical channel through wall structure which is not strictly vertical.

Another object of this invention is to provide means of this character, in which the various parts thereof are easily connectible and disconnectible from the other parts thereof, so that the storing of the various parts is facilitated, and the interchangeability of the various parts with particular reference to the interchangeability of flexible line or cable members having different lengths, constitutes an important element of this invention.

Still another object of this invention is to provide a clamp for the electrical conduit which may be used to pull either the end of a loop of this conduit through the wall structure, the clamp being provided with a setscrew which may be used to positively secure the cable in the clamp when such positive securement is desirable or necessary.

And a last object to be specifically mentioned is to provide a device of this character which is relatively inexpensive and practicable to manufacture, extremely simple and convenient to use, and which will give generally efficient and durable service.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
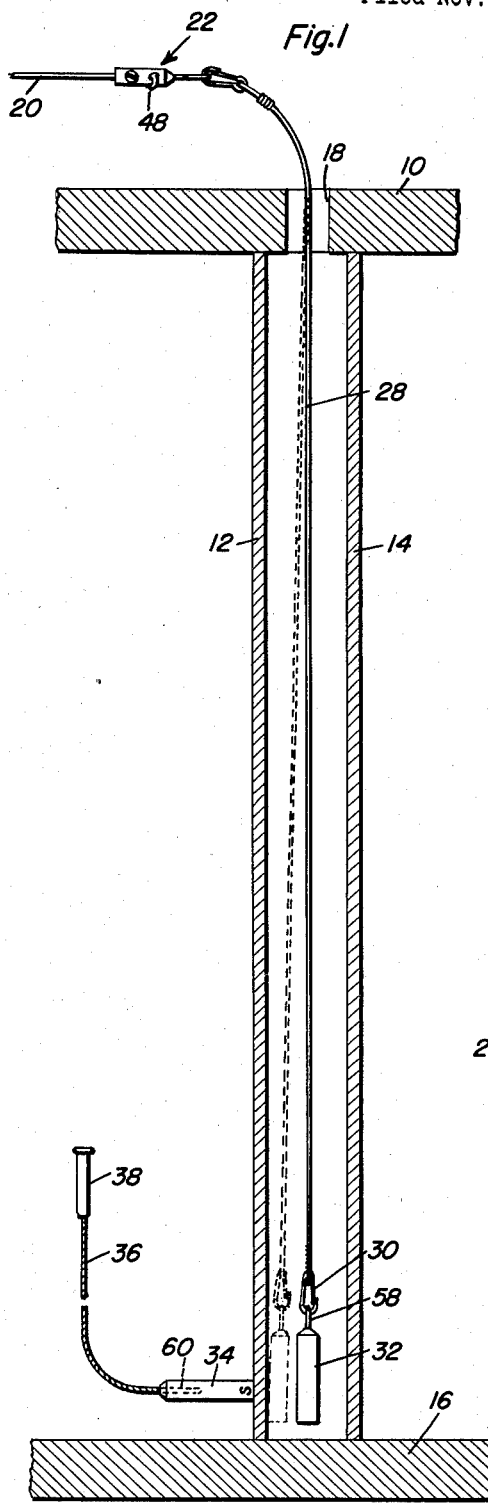
Figure 1 is a sectional view of portions of wall, ceiling and floor structure, with this invention operatively applied thereto.
Figure 2:
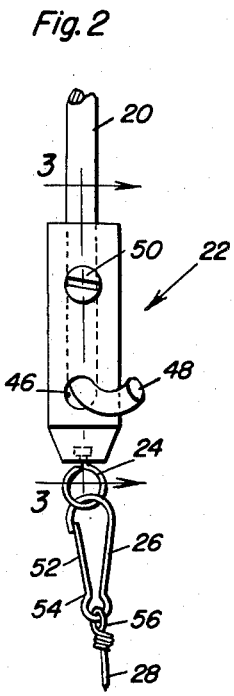
Figure 2 is an enlarged detail view of the cable clamp, a portion of a cable clamped therein, and a portion of the flexible line secured to the clamp by a snap fastener.

Referring to the drawings in detail, the environment wherewith the invention is adapted to be used includes a ceiling 10, a wall having two portions 12 and 14 and a floor 16. This structure is represented as illustrative of the use of this invention, and other structure will obviously be encountered in the practice of this invention. The ceiling 10 is apertured as at 18 at a point between the wall portions 12 and 14 and the drawing represents an arrangement of this invention whereby an electrical conduit 20 may be threaded through the aperture 18, downwardly between the wall sections 12 and 14, and outwardly through the wall section 12 at the base thereof, after a hole is drilled or otherwise formed in said base section at a point detected by the use of this invention.

The principal elements of this invention include the clamp, generally indicated by the numeral 22, a swivel connection including a swivel mounted eye 24 and the snap fastener 26, the flexible line 28, a similar snap fastener 30 and a bob 32 of magnetic material, together with a magnet 34, a flexible form retaining member 36 having a handle 38 thereon.

Figure 3:
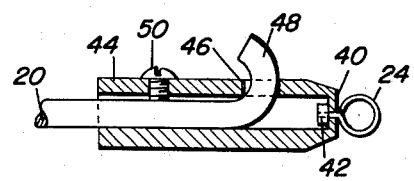
Figure 3 is an enlarged detail view in longitudinal section taken generally along section line 3—3 of Figure 2 with a portion of electrical cable fastened therein and shown in elevation.

The clamp 22 is essentially a cylindrical tubular member, closed at the end 40 which is apertured to receive the shank portion of the eye 24, to which is secured the enlarged terminal 42, whereby this eye 24 is allowed to swivel freely in the end 40 of the clamp. The wall 44 of the clamp is apertured as at 46, to allow the insertion therethrough of the end 48 of the cable 20. It will be understood that this end 48 may be drawn through the aperture 46 a considerable distance, in order to form a loop in the cable 20 and that this loop may be drawn into the wall with the same ease and at the same speed at which a single cable may be so installed. A setscrew 50 is secured in a hole drilled and tapped in the wall 44, this setscrew being provided in order to facilitate the positive clamping of the cable 20 within the clamp 22, the setscrew being frequently unnecessary when an insulated cable is used and the end 48 is bent back as to the left in Figure 3.

The snap fastener 26 may be of any suitable character, that represented in the figures comprising a relatively inflexible elongated hook member and a resilient tongue member 52 which is rigidly secured at the end 54 to the hook member, and the other end of this resilient member being adapted to prevent accidental disengagement of the snap fastener from the eye 24.

The flexible line 28 is secured to the snap fastener 26, as indicated at 56 and the other end of the line 28 is similarly secured to the snap fastener 30. The bob 32 will preferably be substantially cylindrical and provided with an eye 58 into which the snap fastener 30 is secured. This bob will necessarily be constructed of magnetic material and may or may not be magnetized.

The member 34 also may or may not be magnetized unless the bob 32 is not magnetized. If this were the case, then the member 34 would have to be a magnet which we shall assume for explanation. The magnet 34 is preferably constructed with a socket 60, in which is secured a flexible member 36 which is self-sustaining somewhat like the flexible cable employed in a gooseneck lamp for facilitating the manipulation of the magnet 34. It will be seen that this invention is comprised of two main portions which are not interconnected except by function, as will now be described.

The operation of this invention will be reasonably clear from a consideration of the foregoing description of the mechanical details thereof, taken in connection with the above recitation of the objects sought to be achieved by this invention, but it may be expedient to add that the cable 20 will be preferably secured in the clamp 22 by the craftsman, while he is on the level above the building structure 10, and either before or immediately after the bob 32 has been lowered through the aperture 18. Ordinarily the cable 20 may be used to function as suspending means for the line 28, in order that the bob 32 may be suspended a very short distance above the building structure member, referred to above as the floor. In lowering the bob 32, it is preferred that careful attention be given to the length of line 18 payed out during such lowering which length should approximate the known height of the wall members 12 and 14. If the bob 32 should come to rest before sufficient line has been payed out, the craftsman is advised that a channel has not been found extending fully down to the lower structural member, or to the location whereat it is desired to locate the electrical outlet, wall plug, or other required device. The next step in this procedure will ordinarily be carried out by the same craftsman, after descending to the lower level, and comprises the use of the magnet 34 to locate the bob 32. Movement of the magnet 34 in the general area known to be occupied by the bob 32 will cause the bob to swing on any free lower portion of the line 28 and to tap upon the wall portion 12, or some contiguous structure, enabling the craftsman to reasonably accurately locate the bob. With the position of the bob located, it is known that a channel exists from this point upwardly through the wall and through the ceiling member 10. The craftsman, therefore, may now with complete confidence aperture the wall section 12 at the detected point, and reaching in he may withdraw the bob 32 and by pulling on the line 28 draw the cable 20 downwardly through the wall to the length required.

The use of the cable 36 with the handle 38 will depend upon the nature of the electrical work being done, one use of this cable being to move the magnet 34 in the general area known to be occupied by the hidden bob 32, and the deflection of the bob towards the magnet 34 as the magnet 34 is moved slowly over this area, will reasonably accurately detect the position of the bob 32.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. The method of locating a point vertically beneath a hidden point in wall structure, comprising lowering a body of magnetic material from said hidden point and within the wall structure, magnetically attracting said body toward a point outside the wall, and aurally detecting the point where said body strikes said wall.

2. The method of locating a point vertically beneath a hidden point in wall structure, comprising lowering a body of magnetic material from said hidden point to swing within the wall structure, magnetically attracting said body toward a point outside the wall, and detecting the point where said body strikes the wall.

References Cited in the file of this patent

UNITED STATES PATENTS

| | | |
|---|---|---|
| 1,654,819 | Kinley | Jan. 3, 1928 |
| 1,782,151 | Stallan | Nov. 18, 1930 |
| 2,274,055 | Fitzpatrick | Feb. 24, 1942 |
| 2,429,705 | Wadsworth | Oct. 28, 1947 |
| 2,523,351 | Armstrong | Sept. 26, 1950 |
| 2,709,920 | Moore | June 7, 1955 |
| 2,723,369 | Brummett | Nov. 8, 1955 |